United States Patent [19]
Murano

[11] Patent Number: 5,655,189
[45] Date of Patent: Aug. 5, 1997

[54] IMAGE DEVICE HAVING THERMALLY STABLE LIGHT EMITTING/RECEIVING ARRAYS AND OPPOSING LENSES

[75] Inventor: Shunji Murano, Yokaichi, Japan

[73] Assignee: Kyocera Corporation, Kyoto, Japan

[21] Appl. No.: 449,232

[22] Filed: May 24, 1995

[30] Foreign Application Priority Data

| May 27, 1994 | [JP] | Japan | 6-115100 |
| May 27, 1994 | [JP] | Japan | 6-115101 |
| Jun. 16, 1994 | [JP] | Japan | 6-134037 |
| Jun. 16, 1994 | [JP] | Japan | 6-134038 |
| Jun. 22, 1994 | [JP] | Japan | 6-139834 |
| Jul. 13, 1994 | [JP] | Japan | 6-161103 |
| Jul. 14, 1994 | [JP] | Japan | 6-162054 |
| Sep. 8, 1994 | [JP] | Japan | 6-214520 |
| Sep. 14, 1994 | [JP] | Japan | 6-219849 |

[51] Int. Cl.$^6$ ............................................. G03G 15/04
[52] U.S. Cl. ............... 399/220; 399/4; 399/207; 399/221; 359/820
[58] Field of Search .............. 355/228, 229, 355/237, 67; 347/238, 241, 242, 245, 263; 359/819, 820; 358/471; 399/118, 206, 218, 220, 221, 4, 207

[56] References Cited

U.S. PATENT DOCUMENTS

| 4,905,021 | 2/1990 | Iizuka et al. ................... 347/241 X |
| 5,023,442 | 6/1991 | Taniguchi et al. .............. 250/208.1 |
| 5,235,347 | 8/1993 | Lee ..................................... 347/238 |
| 5,235,348 | 8/1993 | Avonts ............................... 347/238 |
| 5,270,869 | 12/1993 | O'Brien et al. ................... 359/820 |
| 5,270,870 | 12/1993 | O'Brien et al. ................... 359/820 |
| 5,313,333 | 5/1994 | O'Brien et al. ................. 359/819 X |
| 5,444,520 | 8/1995 | Murano .............................. 355/229 |

*Primary Examiner*—Matthew S. Smith
*Attorney, Agent, or Firm*—Loeb & Loeb LLP

[57] ABSTRACT

A lens plate is provided with many lenses, and a base plate is provided with many LED arrays and driving ICs arranged at respective opposite ends of the base plate. The lens plate and the base plate are positioned in place relative to each other by spacers. The base plate has a thermal conductive layer and a thermal preserving layer over the layer. Grooves are formed in the preserving layer between the driving ICs and the LED arrays.

18 Claims, 7 Drawing Sheets

IMAGE DEVICE HAVING THERMALLY STABLE LIGHT EMITTING/RECEIVING ARRAYS AND OPPOSING LENSES

FIELD OF INDUSTRIAL APPLICATION

The present invention relates to image devices for use in printers, facsimile apparatus, etc., for example, to a print head of exposure light source for a photosensitive body or an image sensor for reading documents. More particularly, the invention relates to image devices comprising light emitting/receiving arrays and lenses arranged in a one-to-one opposed relation therewith.

PRIOR ART

We have already developed image devices which comprise light emitting/receiving arrays and lenses arranged in one-to-one opposed relation therewith and wherein the light from the light emitting arrays is caused to form an image by the lenses or the light from a document surface is caused by the lenses to form an image on the light receiving arrays. We have found that the countermeasure against temperature variations plays an important role in such an image device. If the center of the light emitting/receiving array fails to coincide with the center of the lens owing to a temperature variation, a blank streak or black streak occurs in the output image. For example, if the light emitting/receiving arrays are LED arrays and become displaced from the respective lenses, the light beams from two arrays lap over each other to form a black streak in the resulting image, or an interstice is created between the beams from the two arrays to produce a blank streak. Such a problem is encountered also with image sensors; in the case of the image device wherein light emitting/receiving arrays and lenses arranged in one-to-one opposed relation therebetween, the measure against thermal expansion due to temperature variations is decisively important.

As a measure against thermal expansion, we made research on the use of radiating fins or the like for cooling the image device. However, since the image device is disposed inside a printer, facsimile apparatus or like apparatus, we found that when the apparatus is, for example, an electrophotographic printer, the photosensitive body, fixing unit, etc. around the device also generate heat, which is likely to be conducted to the interior of the image device if fins are provided. We also carried out research on the use of a heat insulating material around the image device for insulation and found that the heat generated inside the device then entirely accumulates within the device. These findings reveal a need for a new principle other than the release of heat from the device to its surroundings or the insulation of heat from the surroundings.

SUMMARY OF THE INVENTION

An object of the present invention is to prevent the deterioration of images due to the thermal expansion of the image device.

Another object of the invention is to provide means for directly positioning the image device relative to the photosensitive body of a printer.

Other objects will become apparent from the following description.

The present invention provides an image device wherein a base plate having arranged thereon light emitting/receiving arrays and driving ICs therefor is formed with a thermal conductive layer and a thermal preserving layer superposed on the layer. The thermal conductive layer is preferably at least 10 W/m·° C., more preferably at least 40 W/m·° C., in thermal conductivity. The thermal conductivity is limited to not greater than 1000 W/m·° C. when the layer is formed by a material presently available although the upper limit has no substantial meaning. The material for the thermal conductive layer is, for example, a ceramic or metal. Examples of preferred ceramics are those having a high thermal conductivity, such as AlN, BeO and SiC. Also usable besides these are $Al_2O_3$ and the like. Although the metal to be used as the material for the thermal conductive layer is not limited but can substantially be any desired metal, Cu, Al, stainless steel, etc. are desirable. The thickness of the conductive layer is, for example, 0.03 to 2 mm, more preferably 0.05 to 1 mm. Excessively large thicknesses render the image device greater in size, while too small thicknesses result in insufficient thermal conduction and are ineffective.

The thermal preserving layer accumulates the heat delivered thereto from the thermal conductive layer, preventing the thermal expansion of the base plate. The preserving layer is preferably $0.1 \times 10^{-6}$ $m^2$/sec to $1.0 \times 10^{-6}$ $m^2$/sec in thermometric conductivity. If the thermometric conductivity is too low, slow absorption of heat from the thermal conductive layer will take place, whereas if it is too high, heat will be released to the surroundings too rapidly. The thermometric conductivity is so determined that the heat generated inside the image will be rapidly absorbed by the conductive layer and rapidly released to the surroundings. Examples of preferred materials for the thermal preserving layer are various glasses, liquid crystal polymers and plastics such as polycarbonate. Metals and ceramics are exceedingly higher than $1.0 \times 10^{-6}$ $m^2$/sec in thermometric conductivity and are not suitable for the thermal preserving layer. The thickness of this layer is, for example, 0.3 to 5 mm, more preferably 0.5 to 2 mm. When having a greater thickness, the preserving layer makes the image device large-sized, whereas when having a smaller thickness, the layer exhibits a diminished effect to preserve heat.

When the base plate is formed with the thermal conductive layer and the thermal preserving layer superposed thereon as stated above, the conductive layer delivers the heat generated within the image device to the preserving layer and also transports the heat along the base plate to eliminate a temperature distribution within the base plate. The preserving layer preserves the heat delivered from the conductive layer and gradually releases the preserved heat to maintain the base plate at a constant temperature.

The image device has, in addition to light emitting/receiving arrays, driving ICs therefor. The driving ICs are generally greater than the arrays in the quantity of heat generation. Accordingly, when a groove is formed in the thermal preserving layer to divide the layer between the driving IC and the light emitting/receiving array, the groove prevents the transfer of heat from the driving IC toward the array. Generally there are two kinds of driving ICs, i.e., an anode driving IC and a cathode driving IC, and the anode driving IC is greater in the quantity of heat generation. For example, suppose the light emitting/receiving arrays are LED arrays. When the device is driven by a 5-volt power source, the voltage applied to the anode driving ICs is about 3 V, to the LED arrays about 1.5 V and to the cathode driving ICs about 0.5 V. Accordingly, it is especially desirable to disposed the anode driving IC at each of opposite ends of the base plate and to form a groove in the thermal preserving layer between the end portion and the LED array.

Further it is desirable to use a lens plate which is $0.1 \times 10^{-6}$ $m^2$/sec to $1.0 \times 10^{-6}$ $m^2$/sec in thermometric conductivity.

The lens plate then preserves the heat from the driving IC or from outside, whereby the lens can be prevented from thermal expansion. Preferably, the base plate and the lens plate both have a coefficient of thermal expansion of $-1\times10^{-6}/°$ C. to $2\times10^{-6}/°$ C. to reduce the thermal expansion due to temperature variations. The term coefficient of thermal expansion as used herein means coefficient of linear thermal expansion.

Preferably, a spacer is provided with a transparent cover for preventing ingress of toner or the like. It is then more preferable to utilize the transparent cover for positioning the image device relative to the photosensitive body. This makes it easy to attach the image device to the photosensitive body, eliminating the need for attaching members such as space rollers or the like. The cover is attached in the vicinity of the lens, can therefore be attached with improved accuracy and consequently affords images of improved quality.

EMBODIMENTS

Embodiment 1

Figure 1:
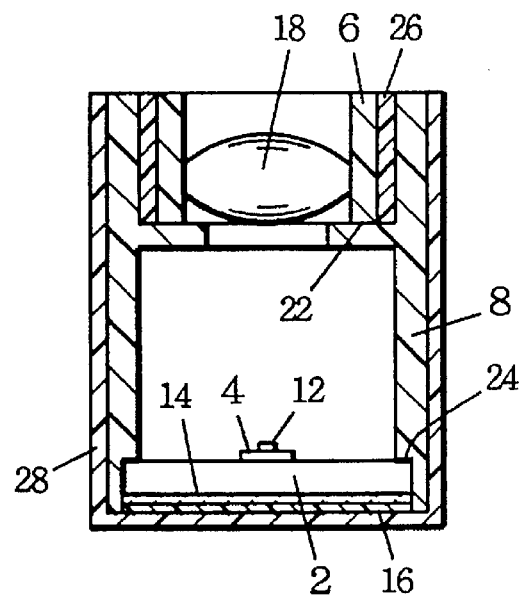
FIG. 1 is a cross sectional view of a first embodiment.
Figure 2:
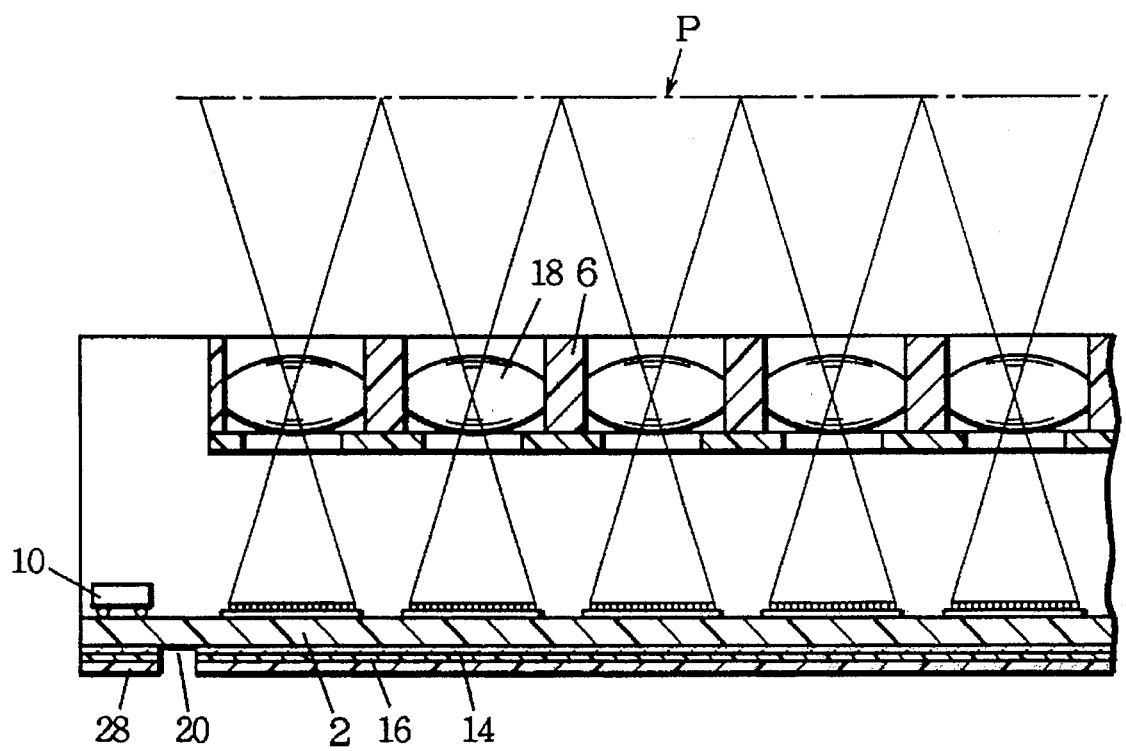
FIG. 2 is a fragmentary view in longitudinal section of the first embodiment.
Figure 3:
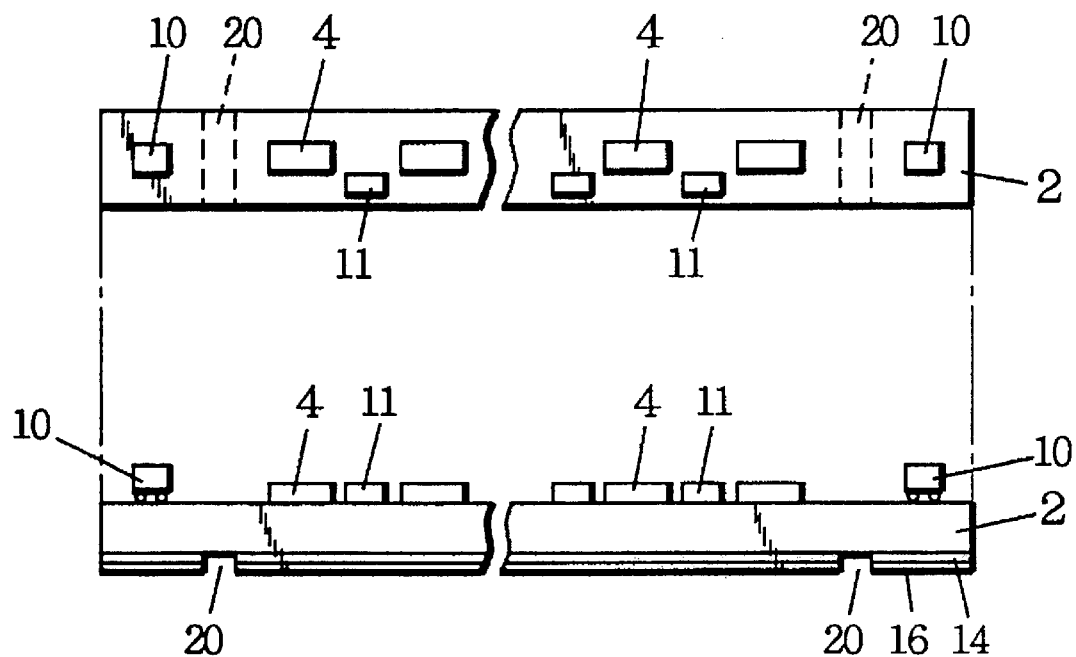
FIG. 3 includes a plan view and a side elevation of the first embodiment.

FIGS. 1 to 3 show an embodiment relating to a photo-print head wherein LED arrays are used. This embodiment is the most preferred embodiment, and the other embodiments and modifications are practiced in the same manner as this embodiment unless otherwise indicated. Throughout the drawings, like parts are designated by like names or like reference numerals. The description of the present embodiment holds true also for the other embodiments and modifications unless otherwise indicated. Although the embodiments include LED arrays as light emitting/receiving arrays, the arrays may alternatively be other light-emitting arrays such as PLZT arrays or light-receiving arrays such as CCD arrays.

FIGS. 1 to 3 show a base plate 2, LED arrays 4 serving as light emitting/receiving arrays, a lens plate 6 and spacers 8. The base plate 2 is made of glass epoxy resin, sintered aluminum oxide, glass or like electrically insulating material and has upper and lower two main surfaces. Arranged on the upper surface are, for example, 32 LED arrays 4, anode driving ICs 10 for driving the anodes (individual electrodes) of the LED arrays 4 and cathode driving ICs 11 for driving the cathodes (common electrodes) of the LED arrays 4. The base plate 2, which is a support for the LED arrays 4 and the driving ICs 10, 11, is prepared, for example, by pouring a solution of epoxy resin into a mass of glass fibers and thereafter thermally curing the epoxy resin.

Each of the LED arrays 4 comprises, for example, 64 LEDs 12. These LEDs 12 emit light selectively in response to a signal from the anode driving IC 10 and project the light on the surface of a photosensitive body P outside the device to form a latent image. The LED 12 is a light-emitting diode of the GaAsP type or GaP type. For example, the light-emitting diode of the GaAsP type is produced first by bringing a gas comprising suitable amounts of $AsH_3$ (arsine), $PH_3$ (phosphine) and Ga (gallium) into contact with a GaAs substrate as heated at a high temperature in an oven to grow a single crystal of GaAsP (gallium-arsenic-phosphorus), an n-type semiconductor, on a surface of the substrate. Next, a film of $Si_3N_4$ (silicon nitride) having a window is formed over the surface of the GaAsP single crystal, and the window portion is then exposed to a vapor of Zn (zinc) to diffuse the Zn locally into the GaAsP single crystal through the window and form a p-type semiconductor, GaAsPZn and pn junction with the GaAsP, whereby the LED 12 is obtained.

In the case of a photo-print head with a resolution of 200 DPI for B4 size, 2048 LEDs 12 (8 LEDs per mm) are necessary. The 32 LED arrays 4 are arranged in alignment, each of which comprises 64 LEDs 12 aligned as a unit. With the present embodiment, the 32 LED arrays 4 are driven dynamically, so that the anode driving ICs 10 and the cathode driving ICs 11 are needed. As seen in FIG. 3, the anode driving ICs 10, 10 are arranged in the vicinity of the respective opposite ends of the base plate 2, and the cathode driving IC 11 is disposed close to the LED array 4. As to the power consumption, the power source voltage is 5 V. The voltage drop across the anode driving ICs 10 is about 3 V, the voltage drop across the LED arrays 4 is 1.5 V, and the voltage drop at the cathode driving ICs 11 is about 0.5 V. The power consumption of the anode driving IC 10 is great because this IC serves also as a constant-current or constant-voltage power source for the LED array 4. The anode driving ICs 10 produce about 60% of the heat generated by the overall image device.

The base plate 2 has its lower surface covered with a thermal conductive layer 14 first and then with a thermal preserving layer 16. The thermal conductive layer 14 delivers to the thermal preserving layer 16 the heat generated by the operation of the LED arrays 4 and the driving ICs 10, 11 mounted on the base plate 2 and, at the same time, conducts the heat along the lower surface of the base plate 2 to render the LED arrays 4 uniform in temperature. The thermal preserving layer 16 absorbs and accumulates the heat of the LED arrays 4 and the driving ICs 10, 11 delivered thereto through the thermal conductive layer 14. Examples of preferred materials for the thermal conductive layer 14 are metals such as copper, aluminum and stainless steel, and ceramics such as SiC, BeO and AlN. It is desired that the material be high in thermal conductivity. The thermal conductivity is at least 10 W/m·° C., preferably at least 40 W/m·° C. Since it is difficult to obtain a thermal conductivity of above 1000 W/m·° C., the upper limit is 1000 W/m·° C. The thickness of the conductive layer 14 is, for example, 0.03 to 2 mm, more preferably 0.05 to 1 mm so as to prevent the image device from becoming large-sized and to ensure sufficient conduction of heat.

Examples of materials suitable for the thermal preserving layer 16 are glasses, liquid crystal polymers and various plastics. Metals and ceramics are exceedingly higher in thermometric conductivity and are therefore not suited. The thermometric conductivity of the thermal preserving layer 16 is, for example, $0.1 \times 10^{-6}$ m²/sec to $1.0 \times 10^{-6}$ m²/sec. The thickness of the layer 16 is, for example, 0.3 to 5 mm, more preferably 0.5 to 2 mm. If too low in thermometric conductivity, the preserving layer 16 absorbs heat from the conductive layer 14 slowly, while if excessively high in this conductivity, the layer releases heat to its surroundings too rapidly. Further if having an excessively large thickness, the preserving layer makes the image device large-sized, whereas too small a thickness fails to achieve a sufficient effect to accumulate heat. The thermal conductive layer 14 is provided over the lower surface of the base plate 2 by adhesion or pressing. The thermal preserving layer 16 is formed over the lower surface of the conductive layer 14 by affixing a preserving layer in the form of a thin plate of glass or the like with an adhesive, or applying a preserving layer of plastic in the form of an emulsion by coating. For reference, Tables 1 and 2 show the thermometric conductivities, coefficients of thermal expansion and thermal conductivities of various materials.

TABLE 1

Thermometric Conductivity and Coefficient of Thermal Expansion

| Material | Coefficient of thermal expansion (/°C.) | Thermometric conductivity (m²/sec) |
|---|---|---|
| 1 Liquid crystal polymer | $2 \times 10^{-6}$ | $0.18$–$0.34 \times 10^{-6}$ |
| 2 Borosilicate glass | $1 \times 10^{-6}$ | $0.7 \times 10^{-6}$ |
| 3 Flint glass | $8 \times 10^{-6}$ | $0.38 \times 10^{-6}$ |
| 4 Polycarbonate | $14 \times 10^{-6}$ | $0.6 \times 10^{-6}$ |
| 5 Synthetic rubber | | $0.16 \times 10^{-6}$ |
| 6 Crown glass | | $0.96 \times 10^{-6}$ |
| 7 Methyl polymethacrylate | $80 \times 10^{-6}$ | $0.1 \times 10^{-6}$ |
| 8 Polyethylene | | $0.13 \times 10^{-6}$ |
| 9 Polystyrene | | $0.06 \times 10^{-6}$ |
| Alumina ceramic | $7.6 \times 10^{-6}$ | $8.3 \times 10^{-6}$ |
| Metallic aluminum | $23 \times 10^{-6}$ | $100 \times 10^{-6}$ |

*The thermometric conductivity of the lens plate 6 is preferably $0.1 \times 10^{-6}$ to $1 \times 10^{-6}$ m²/sec.

TABLE 2

Thermal Conductivity

| Material | Thermal conductivity (W/m · °C.) |
|---|---|
| Ceramic | |
| AlN | 55–250 |
| SiC | 40–80 |
| BeO | 100 |
| Alumina | 17–20 |
| Metal material | |
| Cu | 393 |
| W | 150 |
| Al | 240 |
| Others | |
| Liquid crystal polymer | 0.4–0.6 |
| Borosilicate glass | 1 |
| Polycarbonate | 0.2–1.3 |

*The thermal conductivity of BeO indicated is a maximum value.

Since the base plate 2 has its lower surface covered with the thermal conductive layer 14 first and then with the thermal preserving layer 16, the heat from the LED arrays 4 and the driving ICs 10 on the base plate 2 is smoothly absorbed by the preserving layer 16 through the conductive layer 14. This makes the base plate 2 free from unnecessary heat, preventing the base plate 2 from thermally expanding abnormally. Further if a temperature distribution occurs in the base plate 2 at the portion thereof carrying the LED array, the thermal conductive layer 14 acts to transfer heat from a high-temperature region to a low-temperature region, obviating the likelihood of an error occurring in the pitch of LED arrays 4 owing to the temperature distribution. Consequently, each LED array 4 mounted on the base plate 2 can be accurately positioned at all times relative to a lens 18 supported by the lens plate 6 to be described below. This makes it possible to produce a sharp accurate latent image on the surface of the photosensitive body P.

About ⅔ of the heat generated by the image device is produced by the anode driving ICs 10, so that as shown in FIG. 3, a groove 20 is formed between the neighborhood of each anode driving IC 10 and the neighborhood of the LED array 4 or the cathode driving IC 11 to divide the thermal preserving layer 16 and the thermal conductive layer 14 into three portions. The heat from the anode driving IC 10 is then preferentially absorbed by the preserving layer 16 around the IC 10 without being delivered to the base plate 2 around the LED array 4, whereby the base plate 2 is prevented from thermally expanding abnormally. As a result, the LED array 4 and the lens 18 supported by the lens plate 6 can be positioned more accurately relative to each other.

The lens plate 6 is formed with a plurality of bores as arranged along a straight line, and the lens 18 is fitted in and closes each bore. The lens plate 6 is a member for supporting 32 lenses 18 as arranged at a specified spacing. The bore permits the light emitted by the LEDs 12 of the array 4 to pass through the lens 18. The lens plate 6 is made of glass epoxy resin or the like, preferably of the same material as the base plate 2 so as to have the same coefficient of thermal expansion as the plate 2 and to diminish the deterioration of images due to temperature variations. The lens 18 causes the light emitted by the LEDs 12 to form an image on the photosensitive body P and is made of a transparent resin such as polycarbonate resin or acrylic resin, or a transparent inorganic material such as glass. The lenses 18 are in one-to-one corresponding relation with the LED arrays 4 and are 32 in number like the LED arrays 4.

The base plate 2 and the lens plate 6 are joined to a pair of spacers 8, 8 made of glass epoxy resin or the like. The LED array 4 and the lens 18 are so arranged as to be in one-to-one opposed relation with each other as spaced apart by a predetermined distance. The pair of spacers 8, 8 have an upper surface providing a first reference face 22, and a second reference face 24 at a lower portion thereof. The outer peripheral portion of lower face of the lens plate 6 bears on and is fixed to the first reference face 22 of the spacers 8, 8. The base plate 2 has the outer peripheral portion of its upper surface fixed to the second reference face of the spacers 8, 8 in contact therewith. Thus, the LED array 4 and the lens 18 are arranged accurately in one-to-one opposed relation as spaced apart by the predetermined distance.

A thermal preserving layer 26 of glass, plastic or the like is interposed between the lens plate 6 and the pair of spacers 8, 8. Even if the heat released from the LED arrays 4 or the driving ICs 10, 11 or the heat produced by the fixing unit or the like of an electrophotographic printer is delivered to the lens plate 2, the preserving layer 26 satisfactorily absorbs the heat, preventing the lens plate 6 from thermally expanding abnormally. Consequently, the lens 18 supported by the lens plate 6 and the LED array 4 mounted on the base plate 2 can be positioned in place always accurately relative to each other, permitting a sharp accurate latent image to be formed on the surface of the photosensitive body P.

It is desired that the pair of spacers 8, 8 and the base plate 2 be provided over the outer surfaces thereof with a heat insulating member 28 of polyurethane foam, alumina or like xerogel. When the image device is used as the light source of an electrophotographic printer, the insulating member 28 insulates the lens plate 6 and the base plate 2 from the heat released, for example, from the fixing unit of the printer, consequently permitting the lenses 18 and the LED arrays 4 to be positioned always accurately and making it possible to form sharp and accurate latent images on the surface of the photosensitive body P.

Modification 1

Figure 4:
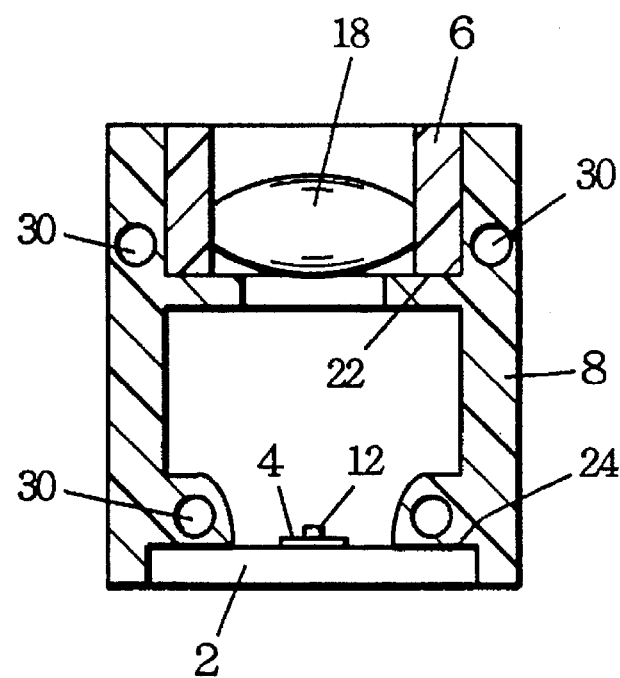
FIG. 4 is a cross sectional view of a first modification.

FIG. 4 shows a modifidation wherein the base plate 2 and the lens plate 6 are thermally stabilized more effectively with use of a heat medium. With this modification, pipes 30 of copper or the like are internally provided in the pair of spacers 8, 8. Water, hot water, alcohol or like heat medium is accommodated in the pipes 30. The heat medium maintains the base plate 2 and the lens plate 6 at a constant temperature, permitting the lenses 18 and the LED arrays 4 to be accurately positioned in place at all times.

Embodiment 2

Figure 5:
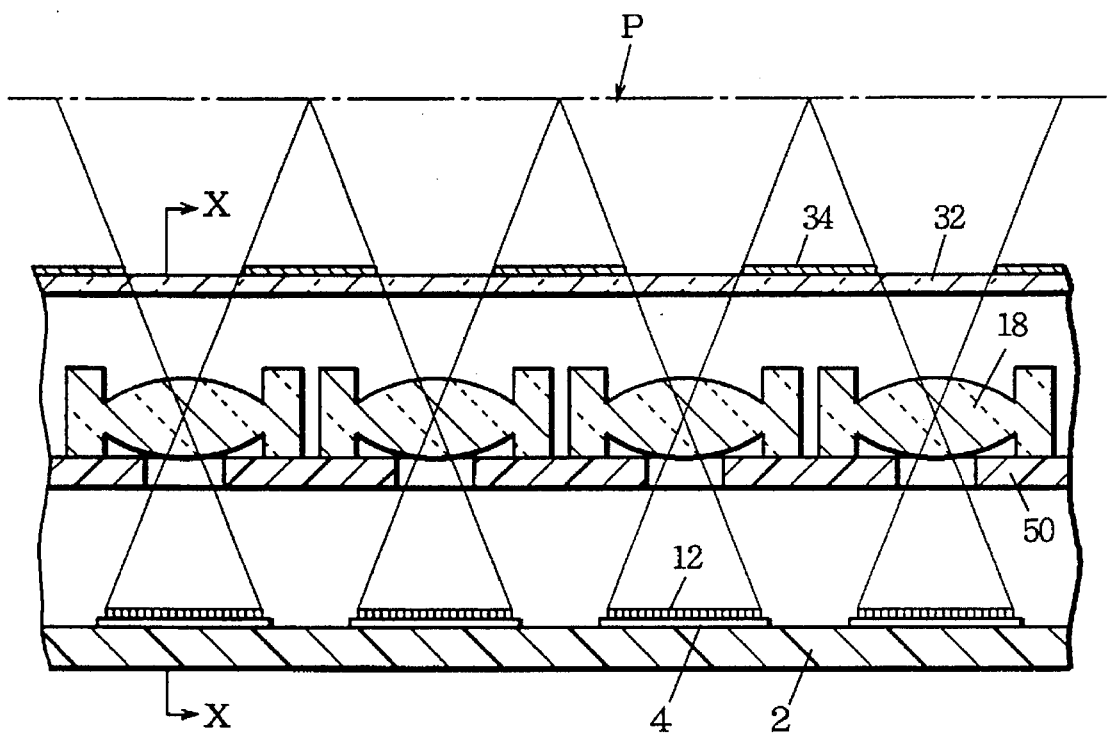
FIG. 5 is a view in longitudinal section of a second embodiment.
Figure 6:
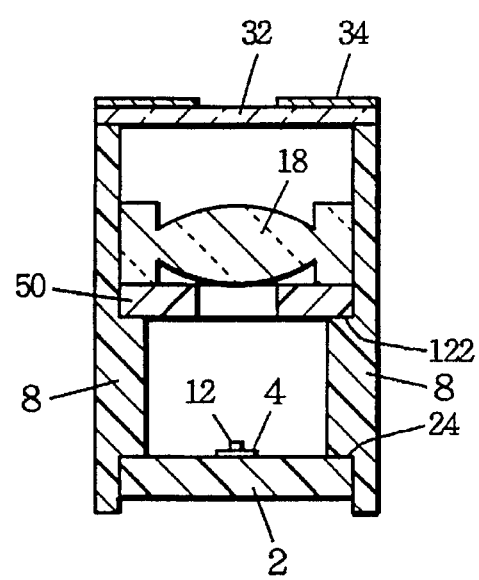
FIG. 6 is a view in section taken along the line X—X in FIG. 5.

FIGS. 5 and 6 show an embodiment wherein a transparent cover 32 is attached to the upper portions of the spacers 8, 8 outside the lenses 18. The cover 32 protects the lenses 18, rendering the lenses 18 free from the toner for use in an electrophotographic printer, dust, etc. The transparent cover 32 is made of an inorganic material such as quartz, soda glass or crystallized glass. When the hardness of the cover 32 in terms of Vickers hardness (Hv) is Hv≧2.8 (GPa), the cover 32 is almost unlikely to be defaced by an external force, consequently permitting the light emitted by LEDs 12 to accurately form an image on the surface of the photosensitive body P through the lens 18 and the cover 32.

The transparent cover 32 is provided on its outer surface with diaphragms 34 each for limiting spreading-out of the light beam of LEDs 12 passing through the lens 18. The diaphragm 34 obviates the likelihood that portions of the light from the LEDs 12 will overlap when impinging on the photosensitive body P, permitting formation of a very sharp latent image on the photosensitive body P. The diaphragm 34 is made, for example, of a metal such as chromium, nickel, titanium, copper, stainless steel or phosphor bronze. The diaphragm 34 is produced by forming a film of chromium, nickel or the like by sputtering, vacuum evaporation or plating on the upper surface of the transparent cover 32, or by affixing to the upper surface of the cover 32 a thin sheet of stainless steel, phosphor bronze or the like which is coated in black color. When the diaphragm 34 is locally connected to a power source and given the same potential as the charged toner for use in the electrophotographic printer, deposition of suspending toner particles to the transparent cover 32 can be prevented effectively.

Indicated at 50 is a lens plate, which is positioned in place with use of a first reference face 122 of the spacers 8. As previously described, the base plate 2 is positioned in place by the second reference face 24 of the spacers 8.

Modification 2

Figure 7:
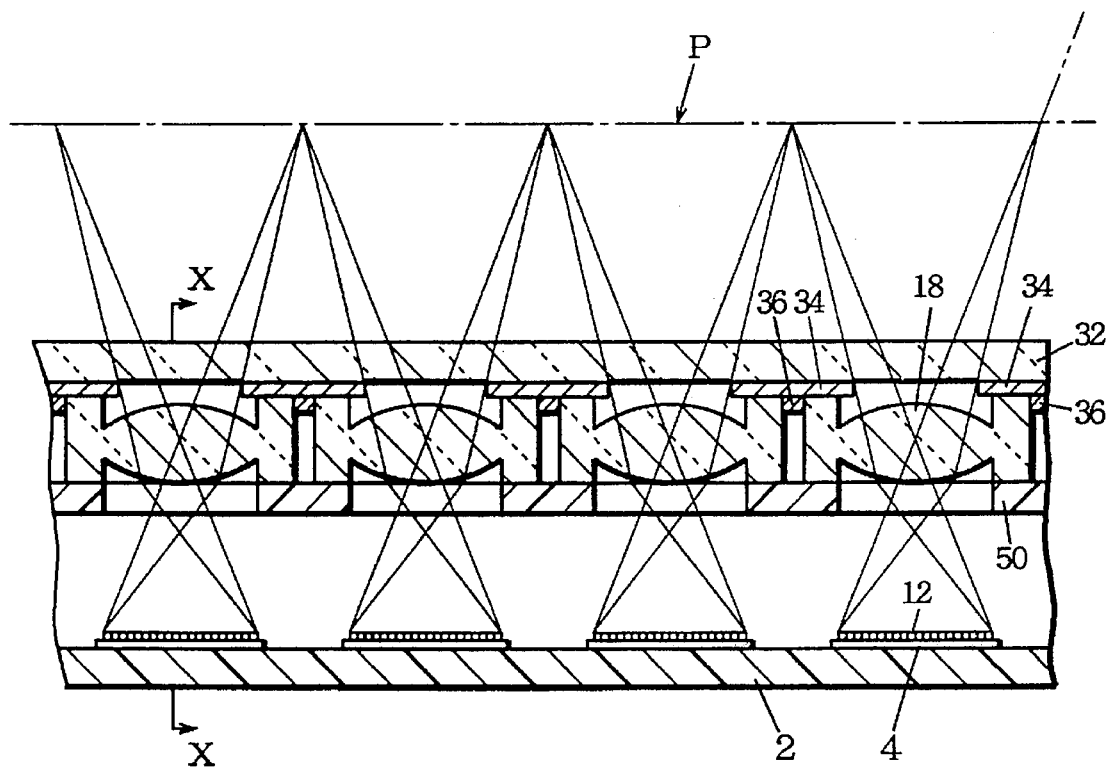
FIG. 7 is a view in longitudinal section of a second modification.
Figure 8:
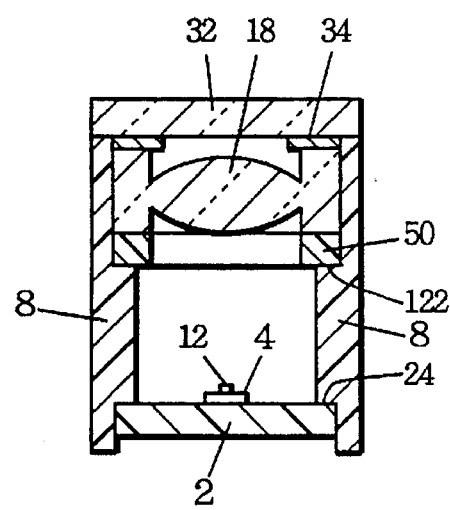
FIG. 8 is a view in section taken along the line X—X in FIG. 7.

FIGS. 7 and 8 show a modification of the embodiment of FIGS. 5 and 6. The modification differs from this embodiment of FIGS. 5 and 6 in that the diaphragm 34 is disposed on the inner surface of the transparent cover 32 (toward the lens 18) and provided with a lens positioning member 36. The diaphragm 34 is formed by forming a film of nickel, chromium, titanium or the like with a thickness of about 0.1 to about 0.5 micrometer by sputtering. A film of copper or the like with a thickness of about 10 to about 50 micrometers is formed locally on the diaphragm 34, for example, by electrolytic plating. Since the lens 18 is positioned in place by the positioning member 36, the lens 18 can be accurately positioned relative to the transparent cover 32.

Modification 3

Figure 9:
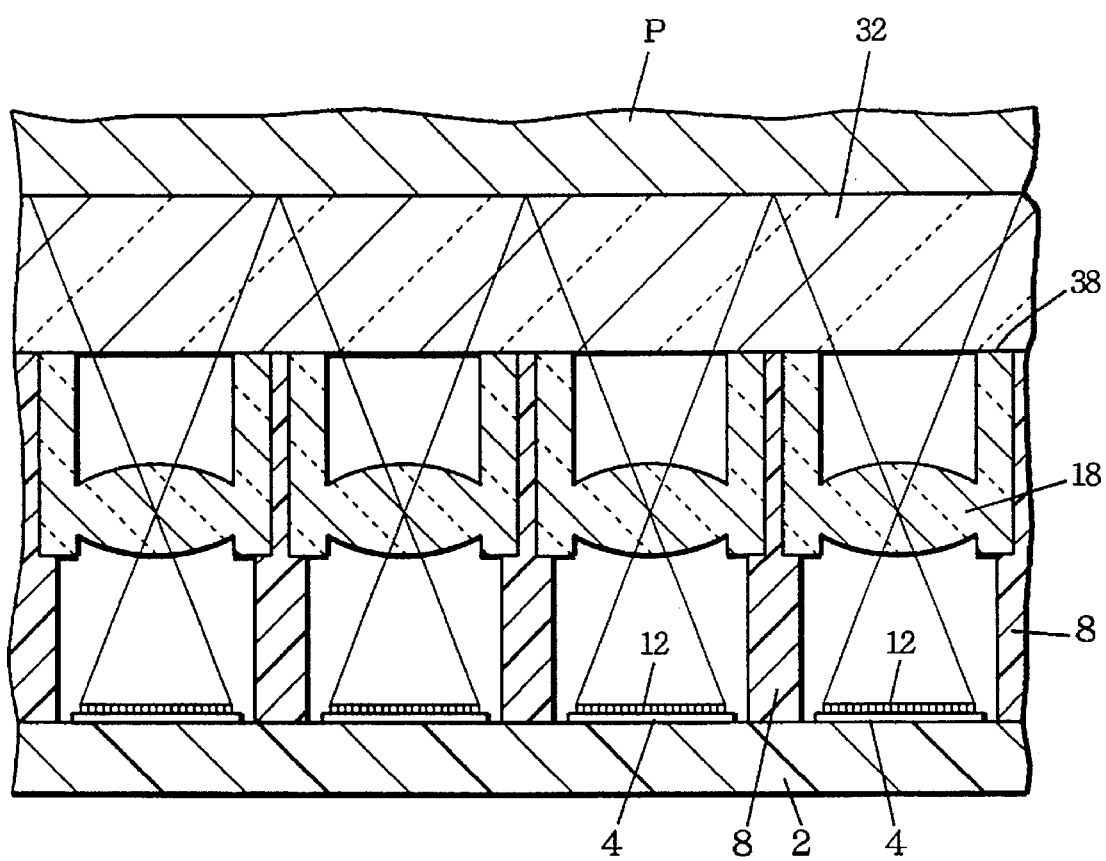
FIG. 9 is a fragmentary view in longitudinal section of a third modification.

FIG. 9 shows another modification of the embodiment of FIGS. 5 and 6. With reference to the drawing, indicated at P is the photosensitive body of an electrophotographic printer, and at 38 is a reference face provided inside the transparent cover 32. The outer peripheral upper portion of the lens 18 is held in contact with the reference face 38 for positioning. With this modification, the upper surface of the cover 32 is held in direct contact with the surface of the photosensitive body P to position the image device relative to the body P. The transparent cover 32 is at least 2.8 in Vickers hardness and therefore will not be defaced by the direct contact with the body P, so that members such as space rollers for positioning the image device relative to the photosensitive body can be dispensed with. Further even if the surface of the body P has irregularities such as undulations, the transparent cover 32 deforms in conformity with the undulations or the like by being pressed against the surface of the photosensitive body P, whereby each lens 18 as positioned in place relative to the cover 32 is slightly shifted in conformity with the undulations or the like of the body P, enabling the light from LEDs 12 to accurately form an image on the body P at all times.

Embodiment 3

The coefficient of thermal expansion and thermometric conductivity of the base plate 2 and the lens plate 6 have not been fully described. When the lens plate 6 is given a coefficient of thermal expansion of $2\times10^{-6}/°$ C. to $-1\times10^{-6}/°$ C. and a thermometric conductivity of $0.1\times10^{-6}$ m$^2$/sec to $1.0\times10^{-6}$ m$^2$/sec, the lens plate 6 is diminished in thermal expansion and given excellent properties to accumulate heat. Examples of such materials are borosilicate glass (coefficient of thermal expansion: $1\times10^{-6}/°$ C., thermometric conductivity: $0.7\times10^{-6}$ m$^2$/sec) and liquid crystal polymers (coefficient of thermal expansion: $2\times10^{-6}/°$ C. or lower, thermometric conductivity: $0.18\times10^{-6}$ to $0.34\times10^{-6}$ m$^2$/sec). As previously stated, it is desired to prepare the base plate 2 and the lens plate 6 from the same material, and it is desired that the base plate 2 be also $2\times10^{-6}/°$ C. to $-1\times10^{-6}/°$ C. in coefficient of thermal expansion. The lens plate 6 is then low in coefficient of thermal expansion and excellent in heat accumulating properties, so that it is diminished in thermal expansion even if temperature variations occur. Further if the base plate 2 is given a coefficient of thermal expansion of $2\times10^{-6}/°$ C. to $-1\times10^{-6}/°$ C., the plate is reduced in thermal expansion to obviate the possible error in the position of the lens 18 and the LED array 4 relative to each other.

The base plate 2 and the lens plate 6 are thus made low in coefficient of thermal expansion, so that even if the temperature of these plates alters, the LED array 4 and the lens 18 remain in position relative to each other. Further when the lens plate 6 is $0.1\times10^{-6}$ m$^2$/sec to $1.0\times10^{-6}$ m$^2$/sec in thermometric conductivity, the lens plate 6 absorbs the heat delivered from the anode driving IC 10 or the fixing unit or the like provided near the photosensitive body P, allowing the lens 18 to remain unaltered in its focal distance to ensure high image forming performance.

Embodiment 4

Figure 10:
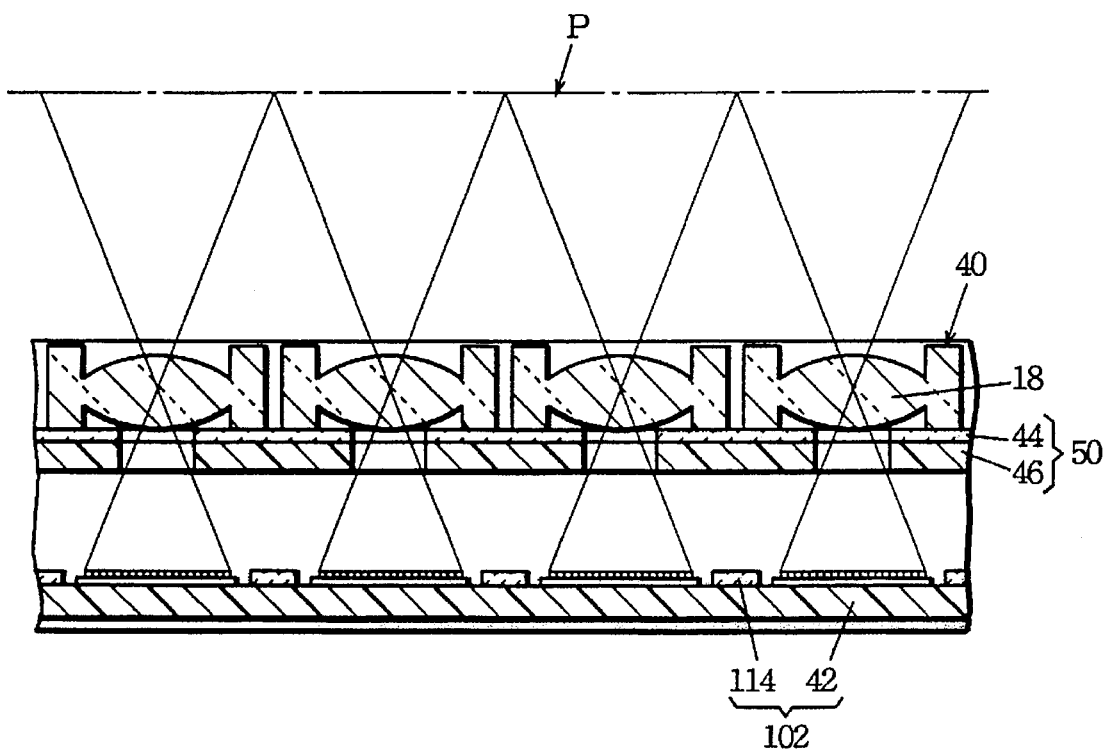
FIG. 10 is a fragmentary view in longitudinal section of a fourth embodiment.
Figure 11:
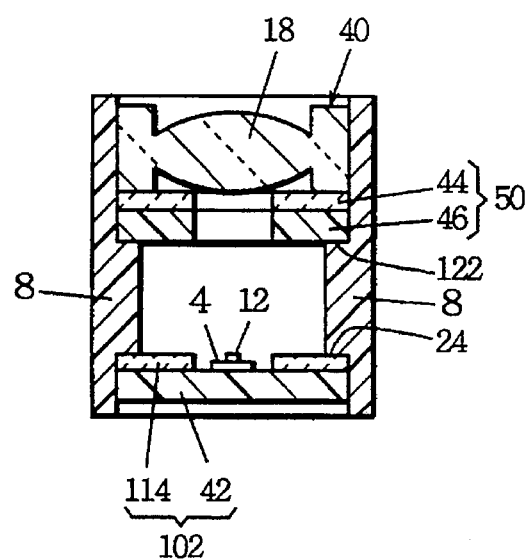
FIG. 11 is a cross sectional view of the fourth embodiment.

FIGS. 10 and 11 show a fourth embodiment. With this embodiment a base plate 102 comprises thermal conductive members 114 which are at least between 10 W/m·°C. and $10^3$ W/m·°C. in thermal conductivity and a thermal preserving member 42 which is $0.1 \times 10^{-6}$ m$^2$/sec to $1.0 \times 10^{-6}$ m$^2$/sec in thermometric conductivity. The conductive members 114 are made of a metal material such as stainless steel, iron, phosphor bronze, copper or aluminum. The preserving member 42 is made of an organic material such as liquid crystal polymer resin, polycarbonate resin or ABS resin. With the image device according to the present embodiment, the heat of the fixing unit or the like of an electrophotographic printer or the heat generated by the operation of LED arrays, if applied to the base plate 102, is rapidly diffused through the entire base plate 102 by the conductive members 114 and is also efficiently absorbed by the thermal preserving member 42, whereby the base plate 102 is precluded from thermally expanding abnormally.

Like the base plate 102, a lens plate 50 comprises a thermal conductive member 44 which is at least between 10 W/m·°C. and $10^3$ W/m·°C. in thermal conductivity and a thermal preserving member 46 which is $0.1 \times 10^{-6}$ m$^2$/sec to $1.0 \times 10^{-6}$ m$^2$/sec in thermometric conductivity. The conductive member 44 is made of a metal material such as stainless steel, iron, phosphor bronze, copper or aluminum. The preserving member 42 is made of an organic material such as liquid crystal polymer resin, polycarbonate resin or ABS resin. Accordingly, even if the heat of the fixing unit or the like of the electrophotographic printer or the heat generated by the operation of LED arrays 4 is applied to the lens plate 50, the heat is rapidly diffused through the entire lens plate 50 by the conductive member 44 and is also efficiently absorbed by the preserving member 46, whereby the lens plate 50 is prevented from thermally expanding abnormally. As a result, each lens 18 supported by the lens plate 50 can be always accurately held opposed to the corresponding LED array 4 mounted on the base plate 2.

The lens plate 50 comprises the thermal conductive member 44 and the thermal preserving member 46, so that even if heat is applied to the lenses 18, the heat is efficiently absorbed by the lenses 18 without giving rise to abnormal thermal expansion. Consequently, the lenses 18 retain a constant focal length at all times, permitting the light emitted by the LEDs 12 and passing through the lenses 18 to form accurate and sharp images on the surface of the photosensitive body P.

Embodiment 5

Figure 12:
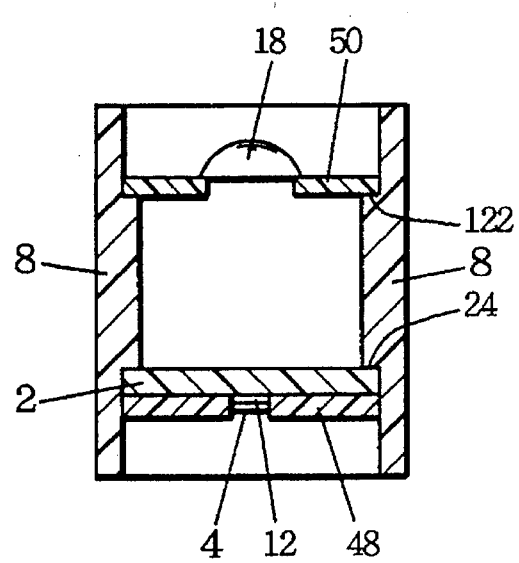
FIG. 12 is a cross sectional view of a fifth embodiment.
Figure 13:
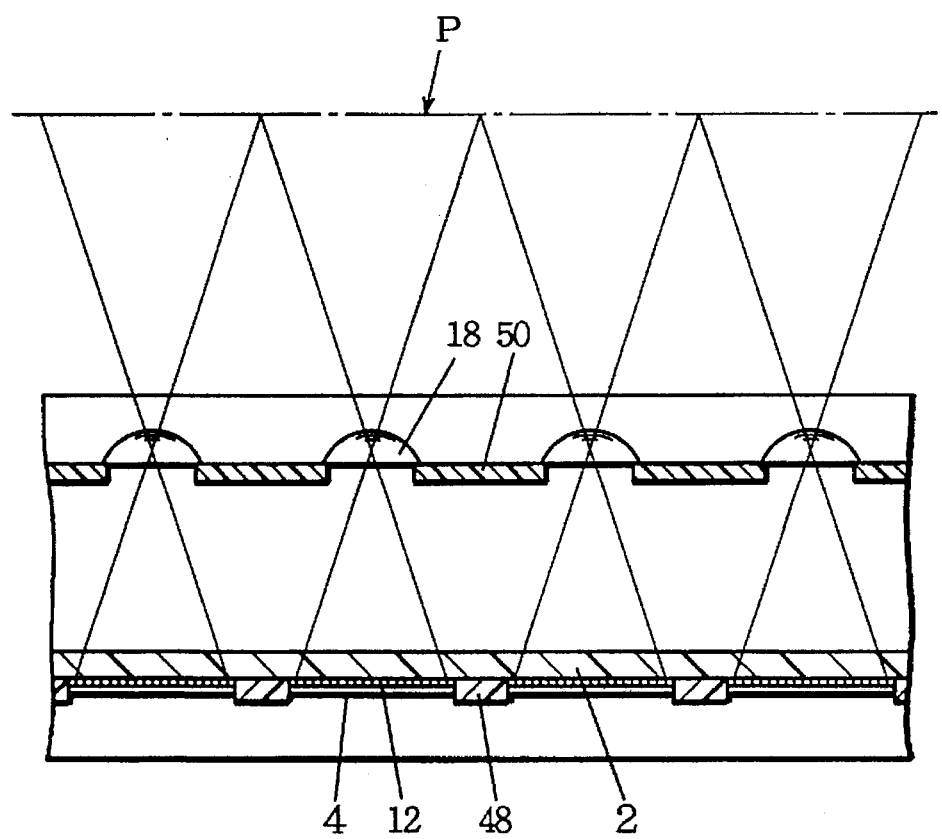
FIG. 13 is a fragmentary view in longitudinal section of the fifth embodiment.

FIGS. 12 and 13 show an embodiment wherein LED arrays 4 are connected by flip chip bonding, and a template 48 is in contact with the side faces of the LED arrays 4 to position the arrays 4 in place. The template 48 is prepared from a liquid crystal polymer or crystallized glass by etching and has heat accumulating properties ($0.1 \times 10^{-6}$ m$^2$/sec to $1.0 \times 10^{-6}$ m$^2$/sec in thermometric conductivity) and a low coefficient of thermal expansion ($2 \times 10^{-6}$/° C. to $-1 \times 10^{-6}$/° C. in the coefficient). Accordingly, even if the heat generated by LED arrays 4 or driving ICs 10 is delivered to the base plate 2, the heat is absorbed by the template 48 without causing abnormal thermal expansion of the base plate 2. Consequently, the LED arrays 4 can be held accurately opposed to the respective lenses 18 at all times, permitting the light emitted by LEDs 12 to accurately impinge on the surface of the photosensitive body P through lenses 18, whereby latent images of high quality can be accurately formed on the photosensitive body P.

Although specific embodiments and modifications have been described above, the present invention can be practiced as modified freely within the scope of the known art.

Especially, light emitting/receiving arrays of desired type are usable, while the bonding method may be facedown bonding or faceup bonding as desired.

What is claimed is:

1. An image device comprising:

a lens plate supporting a plurality of lenses, a base plate having two main surfaces, one of the main surfaces having arranged thereon light emitting/receiving arrays equal in number to the number of lenses and at least one driving IC for driving the light emitting/receiving arrays, the light emitting/receiving arrays being arranged in one-to-one corresponding relation with the lenses, a spacer for positioning the lens plate and the base plate, a thermal conductive layer formed on at least one of the main surfaces of the base plate, and a thermal preserving layer formed on the thermal conductive layer, wherein the thermal conductive layer is 10 W/m·° C. to $10^3$ W/m·° C. in thermal conductivity, and the thermal preserving layer is $0.1 \times 10^{-6}$ m$^2$/sec to $1.0 \times 10^{-6}$ m$^2$/sec in thermometric conductivity.

2. An image device as defined in claim 1 wherein the thermal preserving layer is divided by at least one groove formed therein into a portion around the light emitting/receiving arrays and a portion around the driving IC.

3. An image device as defined in claim 2 wherein the driving IC comprises two kinds of ICs, i.e., at least two anode driving ICs arranged in the vicinity of respective opposite ends of the base plate and a cathode driving IC disposed in the vicinity of the light emitting/receiving arrays, said at least one groove comprising two grooves formed between the anode driving ICs and the light emitting/receiving arrays.

4. An image device as defined in claim 3 wherein both the thermal conductive layer and the thermal preserving layer are divided by said two grooves.

5. An image device as defined in claim 1 wherein the spacer is provided with a pipe having a heat medium accommodated therein.

6. An image device as defined in claim 1 wherein heat insulating means is provided for thermally insulating the base plate and the spacer from outside.

7. An image device as defined in claim 1 wherein a transparent cover is attached to the spacer so as to house the lenses with the cover and the spacer.

8. An image device as defined in claim 7 wherein the transparent cover is provided with diaphragms.

9. An image device as defined in claim 7 wherein the transparent cover is provided with positioning means for positioning the lenses in place.

10. An image device as defined in claim 7 wherein the transparent cover provides positioning means for positioning the image device relative to a photosensitive body for forming latent images thereon.

11. An image device comprising:

a lens plate supporting a plurality of lenses thereon and having a thermometric conductivity of $0.1 \times 10^{-6}$ m$^2$/sec to $1.0 \times 10^{-6}$ m$^2$/sec, a base plate having two main surfaces, one of the main surfaces having arranged thereon light emitting/receiving arrays equal in number to the number of lenses and at least one driving IC for driving the light emitting/receiving arrays, the light emitting/receiving arrays being arranged in one-to-one corresponding relation with the lenses, and a spacer for positioning the lens plate and the base plate in place.

12. An image device as defined in claim 11 wherein the base plate and the lens plate are $-1\times10^{-6}/°$ C. to $2\times10^{-6}/°$ C. in coefficient of thermal expansion.

13. An image device as defined in claim 11 wherein the base plate and the lens plate are each provided with a thermal conductive member having a thermal conductivity of 10 W/m·° C. to $10^3$ W/m·° C.

14. An image device as defined in claim 11 wherein a template having a thermometric conductivity of $0.1\times10^{-6}$ m²/sec to $1.0\times10^{-6}$ m²/sec and a coefficient of thermal expansion of $-1\times10^{-6}/°$ C. to $2\times10^{-6}/°$ C. is attached to the base plate so as to be in contact with side faces of the light emitting/receiving arrays, and the lens plate is $-1\times10^{-6}/°$ C. to $2\times10^{-6}/°$ C. in coefficient of thermal expansion.

15. An image device as defined in claim 11 wherein a transparent cover is attached to the spacer so as to house the lenses with the cover and the spacer.

16. An image device as defined in claim 15 wherein the transparent cover is provided with diaphragms.

17. An image device as defined in claim 15 wherein the transparent cover is provided with positioning means for positioning the lenses in place.

18. An image device as defined in claim 15 wherein the transparent cover provides positioning means for positioning the image device relative to a photosensitive body for forming latent images thereon.

\* \* \* \* \*